United States Patent [19]

Alscher

[11] Patent Number: 5,067,808
[45] Date of Patent: Nov. 26, 1991

[54] THERMAL EXPANSION COMPENSATION PENDULUM

[76] Inventor: Edbert Alscher, Julius Raabstr. 18/1. A-2345, Brunn/Geb., Austria

[21] Appl. No.: 534,734

[22] Filed: Jun. 7, 1990

[30] Foreign Application Priority Data

Jun. 8, 1989 [DE] Fed. Rep. of Germany ....... 3918698

[51] Int. Cl.[5] .......................... G03B 3/00; G02B 7/02
[52] U.S. Cl. ..................................... 352/140; 359/820
[58] Field of Search .......................... 352/35, 131, 140; 350/253

[56] References Cited

U.S. PATENT DOCUMENTS

| 1,325,936 | 12/1919 | Fouasse | 350/253 |
| 2,533,478 | 12/1950 | Lee et al. | 350/253 |
| 2,755,370 | 7/1956 | Arnold | 352/131 |
| 3,205,774 | 9/1965 | Estes | 350/253 |
| 4,515,469 | 5/1985 | Blascher | 352/35 |

Primary Examiner—Monroe H. Hayes
Attorney, Agent, or Firm—Fish & Richardson

[57] ABSTRACT

Device for connecting two components of a motion-picture camera. A thermal expansion compensation pendulum (Rost pendulum) (3) is disposed between the two components (10, 11), said pendulum being composed of a first element (31) connected with one component (11), a second element (32) connected with the component (10), and at least one intermediate element having axial and/or radial play between both elements (31, 32) and being connected therewith. The coefficient of thermal expansion of the intermediate element or elements (33) is a multiple of the coefficients of thermal expansion of the first and second elements.

14 Claims, 3 Drawing Sheets

THERMAL EXPANSION COMPENSATION PENDULUM

The invention relates to a device for linking two components of a motion-picture camera, especially for connecting a lens mount with the camera body or a film guide with the film transport.

In optical devices in general and in motion-picture cameras in particular, extreme dimensional stability of the individual components of the optical device is of maximum importance. Exact dimensional stability in motion-picture cameras ensures precise imaging of the object to be photographed on the image plane and exact film guidance, so that lateral deflecting movements of the film as well as deflecting movements perpendicular to the film plane and hence blurred images as well as unnecessary noise generation are avoided.

German Patent 35 38 827 teaches a motion-picture camera with a housing in which a camera mechanism is enclosed, said mechanism advancing the film by means of a film guide past a film gate in steps, and alternately interrupts and allows to pass, light cast by a lens into the film gate. To reduce the amount of noise generated, a body-noise absorbing but dimensionally stable connection is interposed between the camera mechanism and a lens receiving part, and a body-noise insulating housing seal is inserted between the lens receiving part and the housing.

By specially designing the housing seal in such fashion that it supports the lens receiving part and hence also the parts connected thereto, namely the lens and the camera mechanism by their own force on the housing, a minimum noise level is achieved without the required exact positioning between the lens and the film plane being adversely affected.

With the measures for minimization in the transfer of body noise from the camera interior to the lens, however, materials of a very wide variety are used of necessity, posing the danger that when the motion-picture camera is used in extreme temperature ranges of for example +50° C. to −20° C., the flange focal length, i.e. the distance between the lens mount and the film plane, changes, so that there is a danger that blurred images will be taken.

To avoid noise, in motion-picture cameras, maximum precision is required in manufacturing and assembling the film guide elements, especially as regards the surface and position of the registration pins relative to the film guide. Since there is a gap between the film guide and the registration pins, in which the motion-picture film is moved, it is likewise necessary for this gap to remain absolutely constant for exact maintenance of the image plane and optimum arrangement between the film perforation and the registration pins, which also leads to problems when the motion-picture camera is used at extreme temperature differentials.

The goal of the present invention therefore is to provide a device for connecting two components of a motion-picture camera which ensures high dimensional stability of the connection even at extreme temperature differentials.

The solution according to the invention ensures that various components of a motion-picture camera exhibit high dimensional stability of their connections even at extreme temperature differentials, and extreme differences in the coefficient of thermal expansion between the various structural materials can be compensated for.

This ensures that noise-absorbent materials can be used for preventing or reducing noise and simultaneously a constant connecting mass of the various components is ensured.

One advantageous improvement on the solution according to the invention is characterized by the fact that the first element is composed of a mounting pin connected frictionally and/or positively with one component, the second element is composed of a mounting sleeve connected frictionally and/or positively with the second component, and the intermediate element is composed of an intermediate sleeve connected radially with the mounting pin and the mounting sleeve, with an axial gap provided between the end faces of the intermediate sleeve and the components to be connected with one another.

This design of the thermal expansion compensation pendulum ensures minimum structural size with maximum compensation characteristics, so that the shape of the thermal expansion compensation pendulum, especially for use in precision mechanical devices such as a motion-picture camera is suitable without requiring a larger amount of space.

Another advantageous improvement on the solution according to the invention is characterized by the fact that a radial gap is provided between the inner surface of the mounting sleeve and the outer surface of the intermediate sleeve over a wide area of the two contact surfaces. In addition, the intermediate sleeve can have at one end, a shoulder extending radially over the outer surface of the intermediate sleeve, the surface of said shoulder facing away from the end of the intermediate sleeve abutting one end of the mounting sleeve, and by a small portion of the outer surface of the intermediate sleeve being connected frictionally and/or positively with a corresponding part of the inner surface of the mounting sleeve.

Another advantageous improvement on the solution according to the invention is characterized by the fact that the components of the motion-picture camera to be connected with one another are connected with extension elements between whose ends, located at a free point in the motion-picture camera, a thermal expansion compensation pendulum is disposed.

This improvement on the solution according to the invention makes it possible to connect such elements of a motion-picture camera with one another in a dimensionally stable fashion by means of a thermal expansion compensation pendulum whose arrangement and/or position normally rules out the use of such a thermal expansion compensation pendulum. However, if these components are joined by extension elements at a point where there is sufficient space for providing a thermal expansion compensation pendulum, the exact arrangement of these components, even with extreme temperature differences when the camera is used, can be ensured.

To ensure a constant flange focal length in an extreme temperature range of for example +50° C. to −20° C., to connect the lens mount of a motion-picture camera with the camera body in another embodiment, the two thermal expansion compensation pendulums are arranged symmetrically with respect to the central lengthwise axis of the camera body on either side of the lens hole in the lens holder.

Another advantageous improvement on the solution according to the invention consists in the fact that the mounting pin and mounting sleeve are made of PER- NIFER with a coefficient of thermal expansion of $1.2 \times 10^{-6}$ mm/°C. and the intermediate sleeve is made of an aluminum-fence magnesium-copper alloy with a coefficient of thermal expansion of $23 \times 10^{-6}$ mm/°C.

The invention will now be described in greater detail with reference to the embodiments shown in the drawing.

Figure 1:
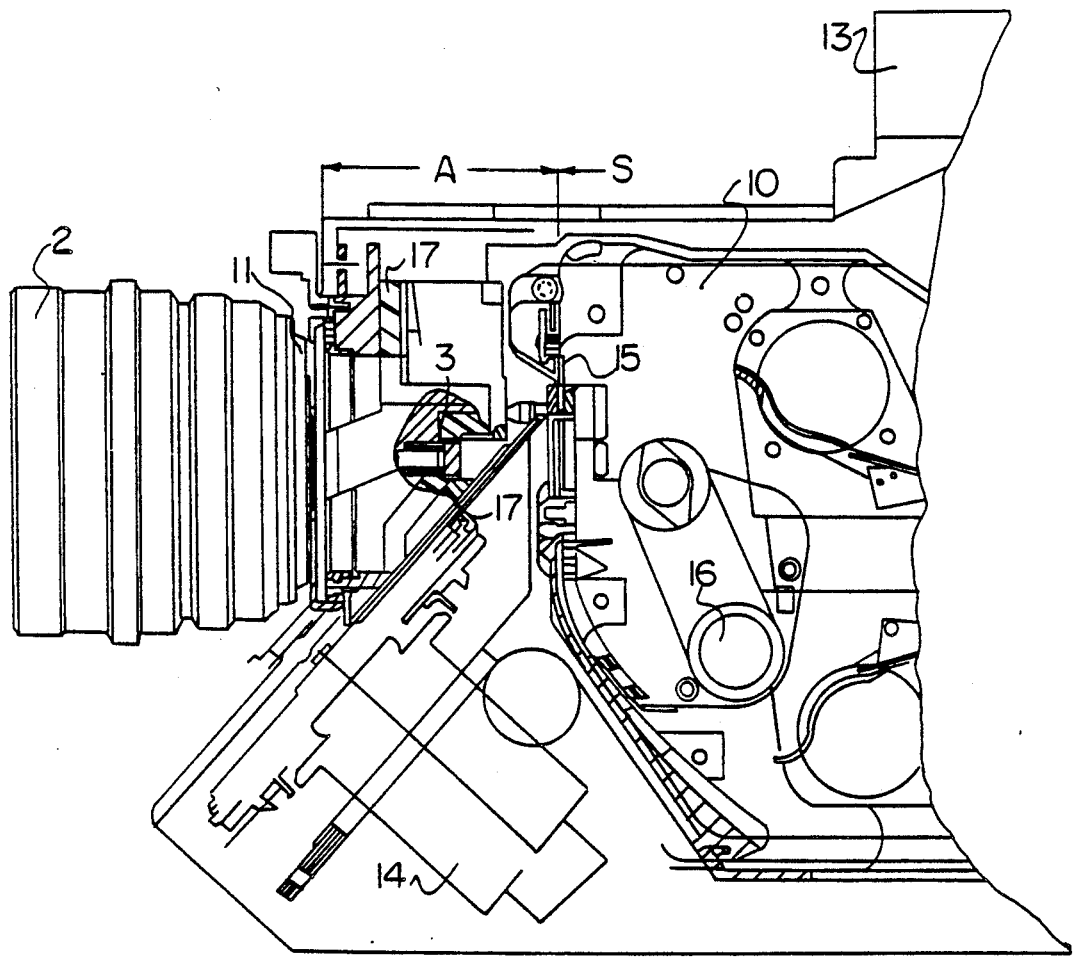
FIG. 1 is a schematic lengthwise section through the forward part of a motion-picture camera.

The lengthwise section shown in FIG. 1 through the forward part of a motion-picture camera 1 shows a shaped element 17 disposed in a housing 13 of motion-picture camera 1, said element being made of a plastic or rubber-like material, provided to reduce the noise at the connection between the lens and the camera interior and minimizes the transmission of body noise from the camera interior to the lens by suitable noise insulation measures.

Shaped element 17 is fastened by screws which tighten a metal plate vulcanized or glued to the shaped element against a forward surface of housing 13 of motion-picture camera 1. On the side of shaped element 17 opposite the metal plate, another metal plate is vulcanized or glued and in turn connected with lens mount 11. An interchangeable lens 2 is mounted in known fashion in lens mount 11.

Film guide plane 15 is formed by a film gap S in which the motion-picture film is guided and transported intermittently by means of registration pins engaging the film holes by an intermittent film transport 16. The film is transported by supply and takeup sprockets to the film cassette, mountable on housing 13 of motion-picture camera 1.

A rotating mirror diaphragm 14 serves to illuminate the film and/or to cover the film during the film transport phase.

Since film transport 16 remains a noise source even with a careful design and maximum precision in the manufacture and assembly of the film guide elements to avoid noise, radiation of said noise to the environment must be prevented as much as possible to prevent interference with sound recordings; hence, shaped element 17 is provided to reduce the transfer of body noise from the vicinity of camera interior 10 to lens mount 11 and hence to lens 2.

However, it is necessary in this regard for the flange focal length A between lens mount 11 and film guide plane 15 to remain constant, with the special design of shaped element 17 and its arrangement contributing partly thereto.

Because of the connection of very different materials with thermal expansion coefficients that differ markedly from one another, such as rubber and aluminum or stainless steel, problems still occur as far as the dimensional stability of flange focal length A is concerned when motion-picture camera 1 is used over a wide temperature range of for example −20° C. to +50° C.

To compensate for the various changes in length of the individual components of the motion-picture camera because of the temperature differences, according to the invention, in the motion-picture camera 1 shown in FIG. 1, a thermal expansion compensation pendulum 3, a so-called Rost pendulum, is placed in the connection between lens mount 11 and camera interior or camera body 10.

The arrangement of thermal expansion compensation pendulum 3 is shown only schematically in FIG. 1.

In the same fashion, a thermal expansion compensation pendulum can be used to connect film transport 16 with film guide plane 15, so that film gap S remains constant in the usual temperature range of motion-picture camera 1 at all temperatures between −20° C. and +50° C., so that deflection movements of the film out of the film plane are avoided and exact engagement of the registration pins in the film holes is ensured to avoid unnecessary generation of noise.

Figure 2:
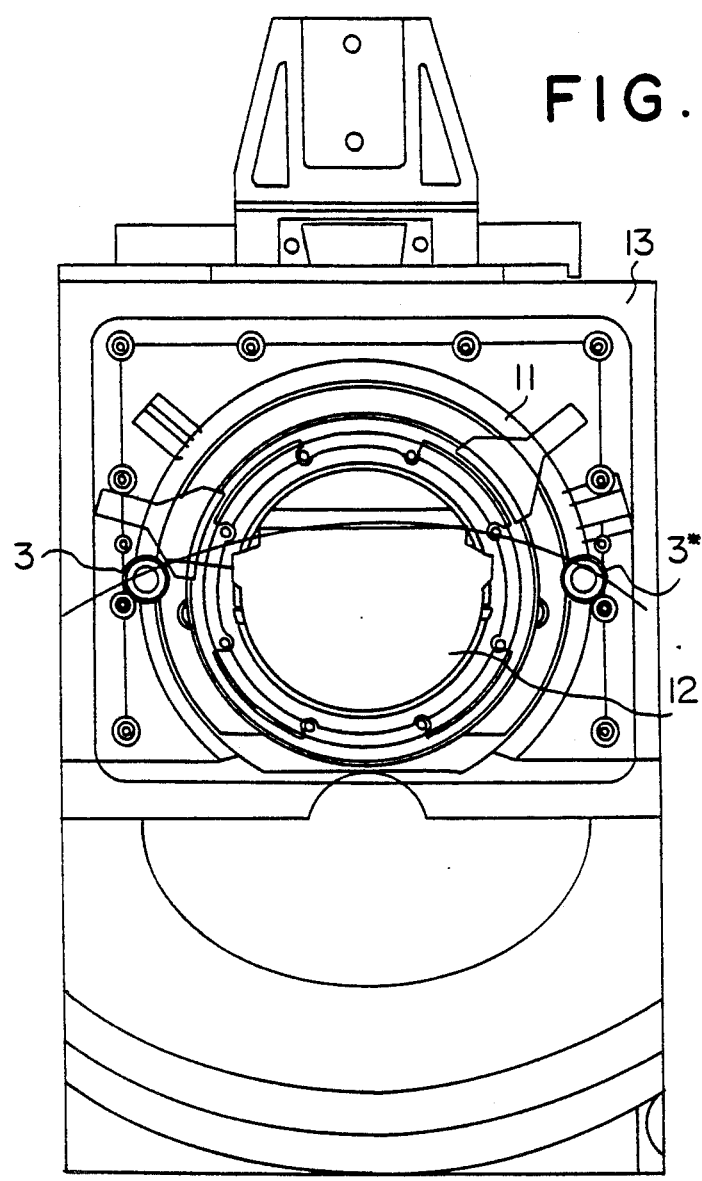
FIG. 2 is a front view of the lens mount of the motion-picture camera.

FIG. 2 shows a front view of motion-picture camera 1 with lens mount 11 and lens hole 12.

Two thermal expansion compensation pendulums 3, 3* are incorporated in the vicinity of the lens axis to the right and left of lens hole 12 in lens mount 11. The exact arrangement of thermal expansion compensation pendulum 3, 3* will be described in greater detail below with reference to FIGS. 3 to 5.

Figure 3:
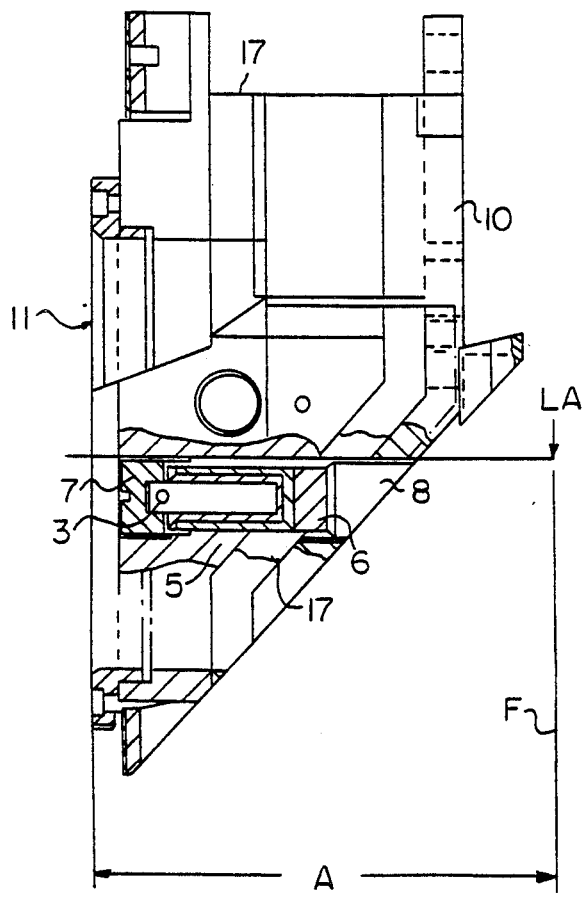
FIG. 3 is a lengthwise section through the camera body in the vicinity of the lens mount.

FIG. 3 shows a lengthwise section through camera body 10 in the vicinity of lens mount 11. This lengthwise section shows the connection of lens mount 11 with camera body 10 by means of one or possibly several shaped elements 17 made of a rubber-like material to minimize the transfer of body noise from the film transport connected with camera body 10 to lens 2 to be connected with lens mount 11, the axis of said lens being marked LA.

To maintain a constant flange focal length A between the plane of lens mount 11 and film plane F, a thermal expansion compensation pendulum 3 is provided which is connected by a first plug 7 with lens mount 11, and by a connecting plate 5, a plexiglass plate 6 and a threaded plug 8 with camera body 10.

In this manner, the end of thermal expansion compensation pendulum 3 which is connected with camera body 10 is inserted into a shaped element 17 to minimize noise transfer, so that only a minimum acoustic link results from thermal expansion compensation pendulum 3. The detailed construction of thermal expansion compensation pendulum 3 will be explained in greater detail below with reference to FIGS. 4 and 5.

Figure 4:
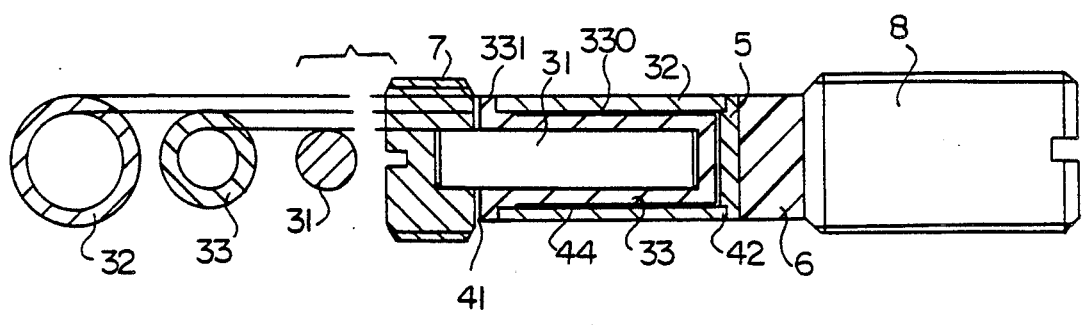
FIG. 4 is a detailed representation of the thermal expansion compensation pendulum.

FIG. 4 is a detailed representation of the thermal expansion compensation pendulum in lengthwise section and schematically in cross section, and the connection of thermal expansion compensation pendulum 3 with a plug 7 connected to lens mount 11 on the on hand and with a mounting plate 5, a plexiglass connecting element 6, and a threaded plug 8 on the other hand, which are connected with camera body 10 as shown in FIG. 3.

The thermal expansion compensation pendulum consists of a fastening pin 31, which in this embodiment is positively connected with plug 7, with the end face of mounting pin 31 firmly abutting the bottom of plug 7.

Mounting sleeve 32 connected with the other component, namely camera housing 10 by means of mounting plate 5, is connected with mounting pin 31 by an intermediate sleeve 33. Intermediate sleeve 33 is U-shaped in lengthwise section with a radial shoulder 331 formed at one end, with the outside diameter of U-shaped part 330 of intermediate sleeve 33 being so dimensioned with respect to a wide part of the inside diameter of mounting sleeve 32 that a radial gap 44 is formed. A positive connection between the outer surface of intermediate sleeve 33 and the inner surface of mounting sleeve 32 is provided only in the vicinity of shoulder 331.

In addition, intermediate sleeve 33 is spaced axially from plug 7 on the one hand and mounting plate 5 on the other hand so that in each case a small axial gap 41, 42 is formed.

The end face of mounting pin 31 opposite plug 7 likewise lies firmly against the bottom of U-shaped body 330 of intermediate sleeve 33, forming a solid contact surface therewith.

The material of mounting pin 31 as well as mounting sleeve 32 is PERNIFER 36 with a coefficient of thermal expansion of $1.2 \times 10^{-6}$ mm/°C. while the material of intermediate sleeve 33 consists of an aluminum-zinc-magnesium-copper alloy (AlZnMgCu 1.5 F52) with a coefficient of thermal expansion of $23 \times 10^{-6}$ mm/°C.

As a result of the different material properties of the mounting sleeve as well as the mounting pin on the one hand and intermediate sleeve 33 on the other hand, assurance is provided that different thermal expansions of the individual components of the motion-picture camera as well as of the fastening elements will be compensated for.

Therefore when the ambient temperature increases, there is a slight expansion of mounting sleeve 32 in the direction of the arrow shown in FIG. 4, while a considerable thermal expansion of intermediate sleeve 33 as a result of the much greater coefficient of thermal expansion takes place in the direction opposite the arrow. With this much greater thermal expansion, as a result of the positive connection between intermediate sleeve 33 and mounting pin 31, intermediate sleeve 33 pulls mounting pin 31 in the direction opposite the arrow thereby compensating for the slight expansion of mounting pin 31 as well as mounting sleeve 32 in the direction of the arrow shown in FIG. 4.

Figure 5:
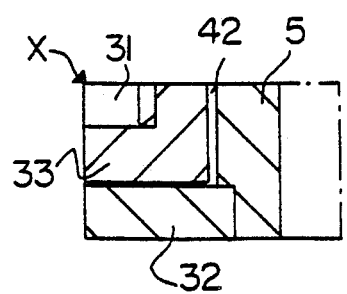
FIG. 5 is an enlarged view of area X of the thermal expansion compensation pendulum according to FIG. 4.

FIG. 5, in an enlargement of section X in FIG. 4, shows the connection of the individual elements 31, 32, 33 of thermal expansion compensation pendulum 3 to form an axial gap 42, which is required for compensating thermal expansion.

The positive connection of individual elements 31, 32, 33 of thermal expansion compensation pendulum 3 shown in FIGS. 4 and 5 as well as their connection with mounting parts 5, 7 of components 10, 11 of the motion-picture camera can also be replaced by a positive connection and by a combined positive and frictional connection.

I claim:

1. A compensating device for connecting two components of a motion picture camera comprising a mounting pin frictionally and/or positively connected with a first component of said camera, a mounting sleeve frictionally and/or positively connected with a second component of said camera, and an intermediate sleeve connected radially with said mounting pin and said mounting sleeve, with an axial gap provided between each end face of said intermediate sleeve and said first and second components.

2. Device according to claim 1 wherein said mounting pin, said mounting sleeve, and said intermediate sleeve being are cylindrical.

3. Device according to claim 1 wherein a radial gap is provided between the inner surface of said mounting sleeve and the outer surface of intermediate sleeve over a wide area of the two contact surfaces.

4. Device according to claim 1 wherein said intermediate sleeve has at one of its ends, a shoulder projecting radially beyond the outer surface of said intermediate sleeve, the surface of said shoulder facing away from the end of said intermediate sleeve and abutting one end of said mounting sleeve and a small part of the outer surface of said intermediate sleeve being frictionally and/or positively connected with a corresponding part of the inner surface of said mounting sleeve.

5. Device according to claim 1 wherein said mounting sleeve is connected by a plate, a connecting element and a cylindrical plug to said second component.

6. Device according to claim 1 wherein said components of the motion-picture camera are connected by extension elements, between whose ends, located in a free space in the motion-picture camera, said device is disposed.

7. Device according to claim 1 wherein said mounting pin and said mounting sleeve are of material with a coefficient of thermal expansion of about $1.2 \times 10^{-6}$ mm/°C. and said intermediate sleeve is of an aluminum-zinc-magnesium-copper alloy with a coefficient of thermal expansion of about $23 \times 10^{-6}$ mm/°C.

8. A motion picture camera comprising a camera body, a lens mount and structure connecting said lens mount with said camera body, said connecting structure comprising two thermal expansion compensation pendulum structures disposed symmetrically with respect to the central lengthwise axis of said camera body on either side of the lens hole of said lens mount, each said thermal expansion compensation pendulum structure including a first element connected to said camera body, a second element connected to said lens mount, and at least one intermediate element connected to and arranged between said first and second elements, said intermediate element having a thermal expansion coefficient that is much greater than the thermal expansion coefficients of said first and second elements, with an axial space between each end of said intermediate element and the adjacent one of said camera body and said lens mount.

9. A thermal expansion compensation device of a Rost pendulum type for connecting two parts of a motion-picture-camera, comprising a frist element connected to one of said parts, a second element connected to the other one of said parts and at least one intermediate-element connected to and arranged between said first and second elements, said intermediate element having a thermal expansion coefficient that is much greater than the thermal expansion coefficients of said first and second elements, with an axial space between each end of said intermediate element and said parts.

10. Device according to claim 9 wherein said first and second elements are of material having a thermal expansion coefficient of about $1.2 \times 10^{-6}$ mm/°C. and said intermediate element is of a aluminum-zinc-magnesium-copper-alloy having a thermal expansion coefficient of about $23 \times 10^{-6}$ mm/°C.

11. Device for connecting two parts of a motion-picture-camera comprising a cylindrical pin member connected to one of said parts,
   a cylindrical main shell member connected to the other one of said parts,
   at least one cylindrical intermediate shell member connected to and arranged between said pin member and said main shell member with a gap between the inner surface of said main shell member and the outer surface of said intermediate shell member and a small part of the outer surface of said intermediate shell member being connected with a corresponding part of the inner surface of said main shell member, said intermediate shell member having a thermal expansion coefficient that is much greater than the thermal expansion coefficients of said pin member and said main shell member, said intermediate shell member having at one end, a radial collar which extends outwardly beyond the outer surface of said intermediate shell member, a surface of said collar touching an end surface of said shell member.

12. Device according to claim 11 wherein said main shell member is connected to a cylinder-plug by a plate and a connection element, which is preferably of plexiglass.

13. Device according to claim 11 wherein said pin member and said main shell member are of material having a thermal expansion coefficient of about $1.2 \times 10^{-6}$ mm/°C. and said intermediate shell member is of a aluminum-zinc-magnesium-copper-alloy having a thermal expansion coefficient of about $23 \times 10^{-6}$ mm/°C.

14. A motion picture camera comprising a camera body component, a lens mount component and structure connecting said lens mount component with said camera body component, said connecting structure comprising two thermal expansion compensation pendulum structures disposed symmetrically with respect to the central lengthwise axis of said camera body component on either side of the lens hole of said lens mount component, each said thermal expansion compensation pendulum structure including a cylindrical pin member connected to one of said components, a cylindrical main shell member connected to the other one of said components, and at least one cylindrical intermediate shell member connected to and arranged between said pin member and said main shell member with a gap between the inner surface of said main shell member and the outer surface of said intermediate shell member and a small part of the outer surface of said intermediate shell member being connected with a corresponding part of the inner surface of said main shell member, said intermediate shell member having a thermal expansion coefficient that is much greater than the thermal expansion coefficients of said pin member and said main shell member, said intermediate shell member having at one end, a radial collar which extends outwardly beyond the outer surface of said intermediate shell member, a surface of said collar touching an end surface of said shell member.

* * * * *